US010525834B2

(12) United States Patent
Sakakibara et al.

(10) Patent No.: US 10,525,834 B2
(45) Date of Patent: Jan. 7, 2020

(54) VEHICLE CHARGE CONTROL DEVICE TO CORRECT A STATE OF CHARGE

(71) Applicant: TOYOTA JIDOSHA KABUSHIKI KAISHA, Toyota-shi, Aichi-ken (JP)

(72) Inventors: Kazuhiko Sakakibara, Toyota (JP); Koji Ito, Nagoya (JP); Hiroshi Sato, Nagoya (JP); Ken Yoshida, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 498 days.

(21) Appl. No.: 15/118,985

(22) PCT Filed: Jan. 28, 2015

(86) PCT No.: PCT/IB2015/000081
§ 371 (c)(1),
(2) Date: Aug. 15, 2016

(87) PCT Pub. No.: WO2015/128709
PCT Pub. Date: Sep. 3, 2015

(65) Prior Publication Data
US 2016/0355098 A1 Dec. 8, 2016

(30) Foreign Application Priority Data

Feb. 27, 2014 (JP) .................. 2014-037448

(51) Int. Cl.
B60L 11/18 (2006.01)
H02J 7/00 (2006.01)
B60L 58/12 (2019.01)

(52) U.S. Cl.
CPC .......... B60L 11/1861 (2013.01); B60L 58/12 (2019.02); H02J 7/008 (2013.01);
(Continued)

(58) Field of Classification Search
CPC .......... B60L 11/1861; B60L 2240/547; B60L 2240/545; B60L 2240/549; H02J 7/008;
(Continued)

(56) References Cited

U.S. PATENT DOCUMENTS 5,561,362 A 10/1996 Kawamura et al.
2001/0022518 A1* 9/2001 Asakura ............. G01R 31/3679
324/426

(Continued)

FOREIGN PATENT DOCUMENTS

JP H05-87896 A 4/1993
JP H07-128416 A 5/1995

(Continued)

OTHER PUBLICATIONS

Eddahech Akram et al; "Determination of lithium-ion battery state-of-health based on constant-voltage charge phase;" Journal of Power Sources; Feb. 15, 2014; vol. 258; pp. 218-227.

Primary Examiner — Drew A Dunn
Assistant Examiner — Sailesh Thapa
(74) Attorney, Agent, or Firm — Oliff PLC

(57) ABSTRACT

A vehicle charge control device includes a charge unit and a correction unit. The charge unit is configured to perform a charge operation for suppressing a deterioration in a battery by charging the battery until a charge end phase in which an acceptance current of the battery is smaller than a predetermined current value, the battery being mounted on a vehicle. The correction unit is configured to correct a charge rate of the battery based on a behavior of the acceptance current. In addition, the correction unit is configured to correct the charge rate based on the behavior in the charge end phase, in synchronization with the charge operation.

18 Claims, 4 Drawing Sheets

(52) U.S. Cl.
CPC ... *B60L 2240/545* (2013.01); *B60L 2240/547* (2013.01); *B60L 2240/549* (2013.01); *Y02T 10/7005* (2013.01); *Y02T 10/705* (2013.01); *Y02T 10/7044* (2013.01)

(58) Field of Classification Search
CPC ............... Y02T 10/705; Y02T 10/7005; Y02T 10/7044
See application file for complete search history.

(56) References Cited

U.S. PATENT DOCUMENTS

| | | | |
|---|---|---|---|
| 2007/0054177 A1* | 3/2007 | Yamashita | G01R 31/3668 429/50 |
| 2012/0109443 A1 | 5/2012 | Takahashi et al. | |
| 2012/0130661 A1* | 5/2012 | Hagimori | G01R 31/3624 702/63 |
| 2012/0306450 A1* | 12/2012 | Nakayama | G06F 1/263 320/134 |
| 2013/0166234 A1* | 6/2013 | Chou | G01R 31/3679 702/63 |
| 2013/0297243 A1 | 11/2013 | Baba et al. | |
| 2015/0212161 A1* | 7/2015 | Soga | H01M 10/44 702/63 |

FOREIGN PATENT DOCUMENTS

| | | |
|---|---|---|
| JP | 2008-231965 A | 10/2008 |
| JP | 2010-247556 A | 11/2010 |
| JP | 2011-015520 A | 1/2011 |
| JP | 2012-149947 A | 8/2012 |
| JP | 2013-130504 A | 7/2013 |
| WO | 2015/049300 A1 | 4/2015 |

\* cited by examiner

VEHICLE CHARGE CONTROL DEVICE TO CORRECT A STATE OF CHARGE

BACKGROUND OF THE INVENTION

1. Field of the Invention

The invention relates to a vehicle charge control device that corrects the charge rate of a battery that is mounted on a vehicle.

2. Description of Related Art

There are known a plurality of methods of correcting the remaining capacity of a battery, including a method in which the accumulated value of a current that is supplied from the battery is used, and the like (e.g., Japanese Patent Application Publication No. 5-87896 (JP-5-87896 A)).

However, according to a method of correcting the charge rate of the battery based on the behavior of an acceptance current of the battery (making a correction with the acceptance current), the charge state of the battery needs to be stabilized for a certain time. Therefore, when a correction with the acceptance current is made on a hit-or-miss basis, for example, a control operation of relatively drastically fluctuating the charge state of the battery (e.g., charge control for controlling the voltage generated by an alternator or the like) may be limited beyond necessity.

SUMMARY OF THE INVENTION

The invention provides a vehicle charge control device that can make a correction with an acceptance current at an appropriate timing.

A vehicle charge control device according to an aspect of the invention includes a charge unit and a correction unit. The charge unit is configured to perform a charge operation for suppressing a deterioration in a battery by charging the battery until a charge end phase in which an acceptance current of the battery is smaller than a predetermined current value, the battery being mounted on a vehicle. The correction unit is configured to correct a charge rate of the battery based on a behavior of the acceptance current. In addition, the correction unit is configured to correct the charge rate based on the behavior in the charge end phase, in synchronization with the charge operation.

According to the aspect of the invention, a correction with an acceptance current can be made at an appropriate timing.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Figure 1:
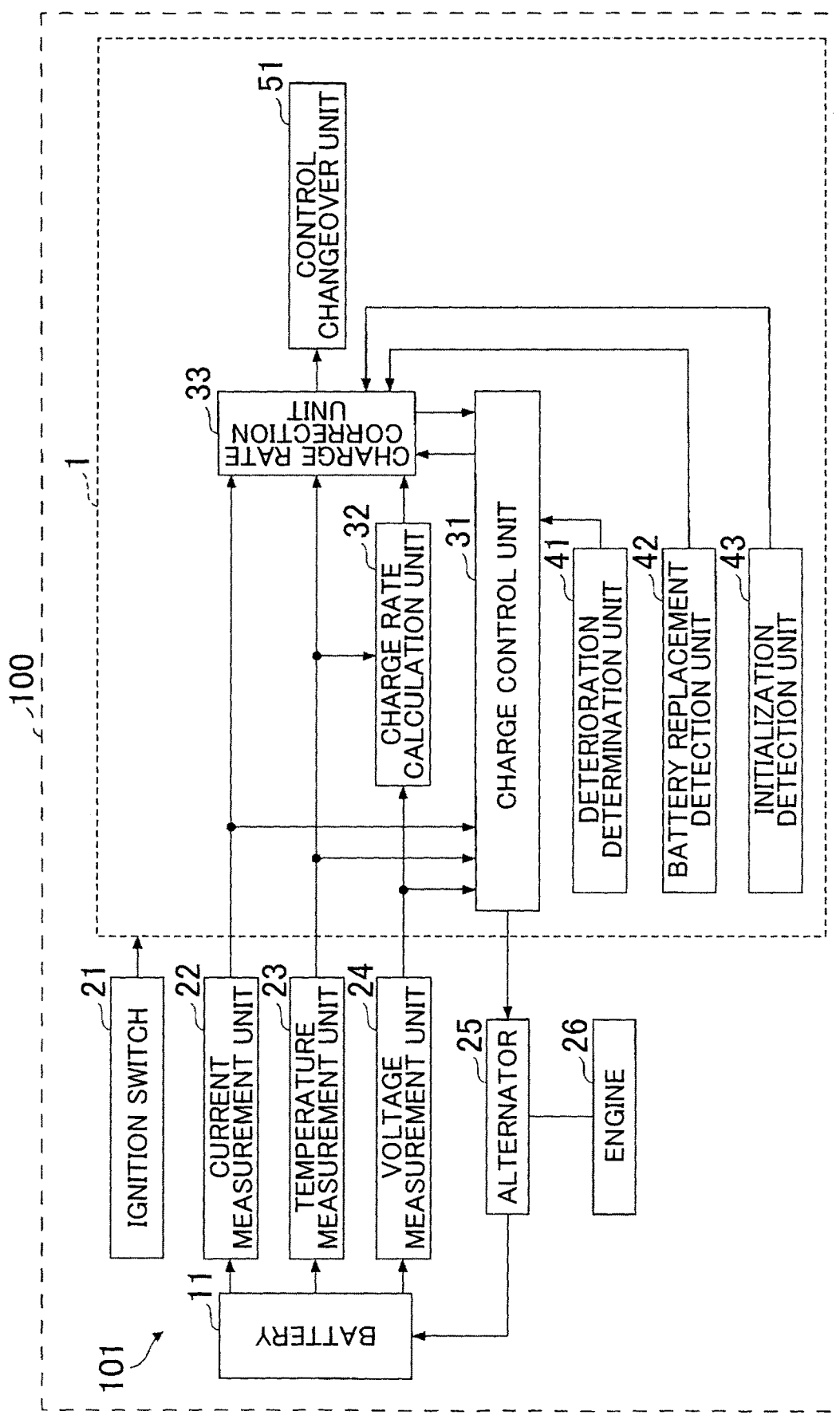
FIG. 1 is a block diagram showing a vehicle charge control device of an embodiment of the invention.

FIG. 1 is a block diagram showing a control device 1 of an embodiment of the invention. The control device 1 is an exemplary vehicle charge control device that is mounted on a vehicle 100, and is a device that controls the charging of a battery 11 that is mounted on the vehicle 100. The control device 1 is, for example, an electronic control unit (an ECU).

The vehicle 100 is equipped with a charge control system 101. The charge control system 101 is equipped with, for example, a battery 11, an ignition switch 21, a current measurement unit 22, a temperature measurement unit 23, a voltage measurement unit 24, an alternator 25, and the control device 1.

The battery 11 is an exemplary secondary battery that can supply electric power to a load installed in the vehicle 100 (e.g., the current measurement unit 22, the control device 1, an electric load (not shown), or the like). The battery 11 is charged through, for example, generation of electric power by the alternator 25, but may be charged by an electric power generation device other than the alternator 25 (e.g., an inverter that supplies regenerative electric power of a motor or the like). The alternator 25 is, for example, a generator that generates electric power in synchronization with rotation of an engine 26 as a motive power source of the vehicle 100. A lead battery can be mentioned as a concrete example of the battery 11.

The ignition switch 21 outputs an ignition signal indicating an off or on state of the ignition switch 21 to the control device 1.

The current measurement unit 22 is an exemplary device that measures a current flowing through the battery 11 (a battery current). The current measurement unit 22 is, for example, a current sensor that detects a charge current flowing to the battery 11 or a discharge current flowing from the battery 11.

The temperature measurement unit 23 is an exemplary device that measures a temperature of the battery 11 itself or a temperature around the battery 11 (a battery temperature). The temperature measurement unit 23 is, for example, a temperature sensor that detects a battery temperature.

The voltage measurement unit 24 is an exemplary device that measures a voltage of the battery 11 (a battery voltage). The voltage measurement unit 24 is, for example, a voltage sensor that detects a battery voltage.

The control device 1 is, for example, an electronic device having a charge control unit 31, a charge rate calculation unit 32, and a charge rate correction unit 33. In the control device 1, respective units such as the charge control unit 31 and the like (including a later-described deterioration determination unit 41 and the like) are realized by, for example, a microcomputer that is equipped with a central processing unit (a CPU).

The charge control unit 31 is an exemplary charge unit that performs a charge operation for suppressing a deterioration in the battery 11 by charging the battery 11 until a charge end phase in which an acceptance current I of the battery 11 is smaller than a predetermined current value Ith. This charge operation will be referred to as hereinafter as refresh charge. Besides, the acceptance current I is a charge current flowing to the battery 11.

Refresh charge is the charging of the battery to a relatively high charge rate (e.g., SOC=95% or more) over a relatively long charge time (e.g., 30 minutes or more) under a charge condition with a constant small current and a constant high voltage.

Incidentally, the state of charge (the SOC) representing the charge rate of the battery is, for example, a value that is defined as (remaining capacity (Ah)/full charge capacity (Ah))×100(%).

A deterioration in the battery 11 can be restrained from progressing by carrying out refresh charge. For example, in the case of a lead battery, the absolute capacity of the battery 11 decreases due to sulfation causing deposition of lead sulfate crystals on a positive plate and a negative plate of the battery 11, so a deterioration in the battery 11 progresses. However, the lead sulfate crystals can be decomposed and removed by carrying out refresh charge. Therefore, a deterioration in the battery 11 can be restrained from progressing due to sulfation.

The charge rate calculation unit 32 is an exemplary calculation unit that calculates a charge rate of the battery 11. The charge rate calculation unit 32 calculates, for example, an SOC of the battery 11.

The charge rate correction unit 33 is an exemplary correction unit that corrects the charge rate of the battery 11 calculated by the charge rate calculation unit 32, based on the behavior of the acceptance current I of the battery 11. The charge rate correction unit 33 corrects the SOC of the battery 11 based on the behavior (the temporal variation) of the acceptance current I measured by the current measurement unit 22, in accordance with, for example, a known charge acceptance characteristic regarding the battery 11. The charge acceptance characteristic is a characteristic indicating a relationship between the acceptance current I and the SOC. The charge rate correction unit 33 utilizes, for example, data representing the charge acceptance characteristic measured in advance with regard to the battery 11.

Figure 2:
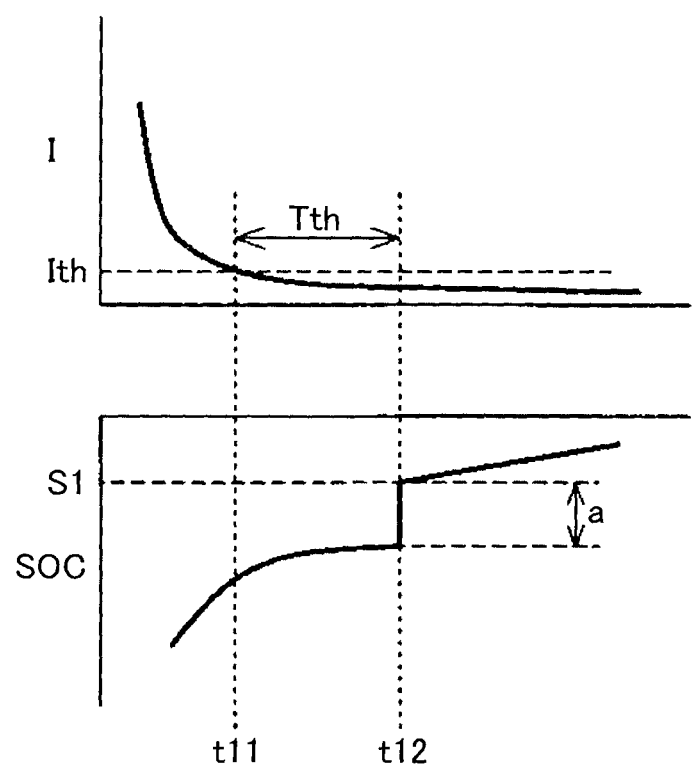
FIG. 2 is a timing chart showing an exemplary correction with an acceptance current.

FIG. 2 is a timing chart showing an exemplary method of correcting the SOC of the battery 11 based on the behavior of the acceptance current I of the battery 11 (making a correction with the acceptance current I). FIG. 2 shows a process in which the battery 11 is charged until a charge end phase in which the acceptance current I is smaller than the predetermined current value Ith. The state of the battery 11 in the charge end phase is a substantially full charge state prior to a full charge state (e.g., the SOC=90% or more).

For example, when the battery 11 is charged over a relatively long charge time under a charge condition with a constant small current and a constant high voltage and then reaches the substantially full charge state, the current value of the acceptance current I rapidly decreases, and the acceptance current I at and after a timing t11 decreases below the predetermined current value Ith. Then, at and after the timing t11, when the battery 11 continues to be charged under the same charge condition, the rate of change in the current value of the acceptance current I becomes equal to or smaller than a predetermined rate of descent, and the rate of change in the SOC becomes equal to or smaller than a predetermined rate of ascent.

The battery 11 has a charge acceptance characteristic that the SOC is equal to a constant S1 (e.g., 95%) at a timing t12 upon the lapse of a constant time Tth (e.g., 2 minutes) from the timing t11 at which the acceptance current I decreases below the current value Ith (e.g., 3 A).

Accordingly, the charge rate correction unit 33 charges the battery 11 over a relatively long charge time under a charge condition with a constant small current and a constant high voltage, and makes a correction of replacing a current value of the SOC upon the lapse of the constant time Tth from a decrease in the acceptance current I below the current value Ith with the constant S1. In the case of FIG. 2, the charge rate correction unit 33 makes a correction of resetting the SOC at the timing t12 to a post-correction SOC (=the constant S1) that is offset from a pre-correction SOC at the timing t12 by an offset amount a.

In this manner, the charge rate correction unit 33 can correct the charge rate of the battery 11 with high accuracy, by making a correction with the acceptance current I. Then, after making the correction with the acceptance current I, the charge rate correction unit 33 can also correct the charge rate at and after the timing t12 with high accuracy, by continuing to make another correction such as integration of the charge/discharge current of the battery 11 or the like with respect to the post-correction SOC obtained through the correction with the acceptance current I.

Besides, the charge rate correction unit 33 can make a correction with the acceptance current I at an appropriate timing by correcting the charge rate of the battery 11 based on the behavior of the acceptance current I in the charge end phase in synchronization with refresh charge. This is because the state of the battery 11 can be shifted to a substantially full charge state required for making a correction with the acceptance current I, through refresh charge for suppressing a deterioration in the battery 11.

Accordingly, an effect of, for example, making the securement of an opportunity to perform a control operation of relatively drastically fluctuating the charge state of the battery and the enhancement of the accuracy in correcting the charge rate of the battery compatible with each other is obtained by synchronizing a correction with the acceptance current I with refresh charge. For example, the control operation of relatively drastically fluctuating the charge state of the battery can be prevented from being limited (also from being prohibited) only for a correction with the acceptance current I. Besides, a correction with the acceptance current I can be made, for example, prior to a great progress of a deterioration in the battery, so the charge rate of the battery can be accurately and continuously corrected.

Incidentally, as the control operation of relatively drastically fluctuating the charge state of the battery, for example, charge control for controlling the voltage generated by an alternator, stop-and-start control (S&S control) and the like can be mentioned. S&S control is the control of temporarily stopping the engine upon fulfillment of a predetermined stop condition and restarting the engine upon fulfillment of a predetermined start condition.

In FIG. 1, the control device 1 has, for example, a deterioration determination unit 41. The deterioration determination unit 41 is an exemplary determination unit that determines a degree of deterioration in the battery 11. The deterioration determination unit 41 determines a degree of deterioration in the battery 11, based on an evaluable index.

As such an index, for example, the integrated value of the number of times of idling stop of the engine 26 mounted on the vehicle 100, the integrated value of an idling stop time of the engine 26, the integrated value of a discharge amount of the battery 11, the amount of a drop in the voltage of the battery 11, and the like can be mentioned.

When the degree of deterioration determined by the deterioration determination unit 41 reaches a predetermined threshold th, the charge control unit 31 carries out refresh charge. When refresh charge is carried out, the degree of deterioration in the battery 11 is initialized. When the degree of deterioration reaches the predetermined threshold th, refresh charge is carried out. Thus, the charge rate correction unit 33 can make a correction with the acceptance current I in synchronization with the attainment of the predetermined threshold th by the degree of deterioration. Accordingly, a correction with the acceptance current I can be made at a desired timing corresponding to a degree of progress of a deterioration in the battery 11, with a timing of last refresh charge regarded as a starting point.

Figure 3:
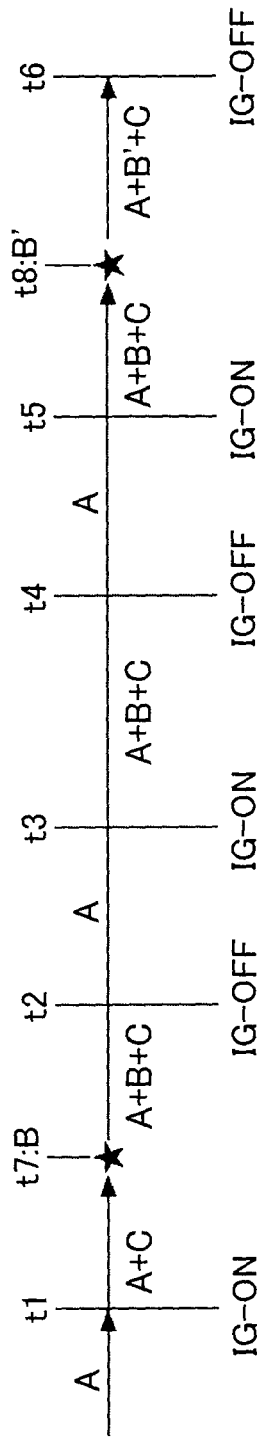
FIG. 3 is a timing chart showing an exemplary method of correcting a charge rate.

FIG. 3 is a timing chart showing an exemplary method of correcting the charge rate of the battery 11. Each of periods t1-t2, t3-t4 and t5-t6 is a period in which the ignition switch 21 is on. Each of periods t2-t3 and t4-t5 is a period in which the ignition switch 21 is off. B and B' represent a correction with the acceptance current I. The correction B is made when refresh charge is carried out at a timing t7 in the period t1-t2. The correction B' is made when refresh charge is carried out at a timing t8 in the period t5-t6.

The charge rate correction unit 33 corrects the charge rate of the battery 11 based on, for example, a correction value Δ that is calculated based on the behavior of the acceptance current I in the charge end phase in synchronization with refresh charge. For example in the case of FIG. 3, the correction value Δ is calculated at the timing t7, and is newly calculated at the timing t8. In the case where the correction value Δ is calculated before the degree of deterioration reaches the threshold th, the charge control unit 31 does not carry out refresh charge. For example, if the degree of deterioration does not reach the threshold th in the period t3-t4 in which the ignition switch 21 is on, refresh charge is not carried out, so a correction with the acceptance current I is not made either. Accordingly, a correction with the acceptance current I can be prevented from being made beyond necessity.

If refresh charge is not carried out because the correction value Δ is calculated before the degree of deterioration reaches the threshold th, the charge rate correction unit 33 corrects the current charge rate obtained by the charge rate calculation unit 32, based on the correction value Δ already calculated in synchronization with refresh charge carried out prior to the last time. For example, the charge rate correction unit 33 corrects the charge rate in a period from the timing t7 to the timing t8 at which the correction value Δ is subsequently calculated, based on the correction value Δ calculated at the timing t7. Thus, even if the correction value Δ is not calculated because refresh charge is not carried out, the charge rate can be continued to be corrected with high accuracy, based on the correction value Δ already calculated.

The correction value Δ is a value that is determined in accordance with, for example, a difference D between a first calculated value α1 of the charge rate that is calculated based on the behavior of the acceptance current I in the charge end phase in synchronization with refresh charge and a second calculated value α2 of the charge rate that is calculated, based on a voltage of the battery 11, around the same time that the first calculated value α1 is calculated. That is, the second calculated value α2 is a charge rate that is calculated based on the voltage of the battery 11 in the charge end phase, based on a law of relation between the voltage of the battery 11 and the charge rate. The correction value Δ may be, for example, a value equal to the difference D or a value that is obtained by multiplying the difference D by a predetermined proportionality constant.

Accordingly, the charge rate correction unit 33 may make a correction of, for example, resetting the current charge rate of the battery 11 to a value that is obtained by adding or subtracting the correction value Δ to or from the charge rate calculated by the charge rate calculation unit 32.

The charge rate correction unit 33 corrects the charge rate calculated by the charge rate calculation unit 32 according to, for example, a method different from the method of calculating the charge rate based on the behavior of the acceptance current I in the charge end phase in synchronization with refresh charge, based on the correction value Δ.

As a concrete example of the different method of calculating the charge rate, a method of calculating a charge rate based on the integrated value of a charge/discharge amount of the battery can be mentioned. Alternatively, a method of calculating a charge rate based on a battery voltage in a state where the ignition switch of the vehicle is off and the integrated value of a charge/discharge amount of the battery in a state where the ignition switch is on can be mentioned.

The charge rate calculation unit 32 calculates a charge rate β of the battery 11 based on a voltage of the battery 11 in a state where the ignition switch 21 is off, based on, for example, a law of relation between the voltage of the battery 11 and the charge rate. A in FIG. 3 represents calculation of the charge rate β in accordance with the battery voltage. Then, the charge rate correction unit 33 corrects the charge rate β by adding or subtracting the integrated value (Ah) of the battery current measured by the current measurement unit 22 to or from, for example, a remaining capacity (Ah) corresponding to the charge rate β calculated by the charge rate calculation unit 32. C in FIG. 3 represents a correction of the charge rate β through integration of the battery current. Furthermore, the charge rate correction unit 33 corrects the charge rate β based on the correction B with the acceptance current I.

Even if the current cannot be integrated by the current measurement unit 22, for example, in a state where the ignition switch 21 is off, the charge rate of the battery 11 can be continued to be corrected with high accuracy for a long time by combining a plurality of correction methods in this manner.

In FIG. 1, the control device 1 may have a replacement detection unit 42 that detects replacement of the battery 11 based on, for example, a signal capable of detecting removal and installation of the battery 11. The replacement detection unit 42 is an exemplary detection unit that detects replacement of the battery 11. The replacement detection unit 42 detects replacement of the battery 11 by, for example, detecting a change in the internal resistance of the battery 11.

The charge rate correction unit 33 corrects the current charge rate based on the behavior of the acceptance current I in synchronization with a detection timing at which replacement of the battery 11 is detected by the replacement detection unit 42. For example, the charge rate correction unit 33 corrects the charge rate of the battery 11 based on the behavior of the acceptance current I until the lapse of a predetermined time from a timing at which the battery 11 is fitted to the vehicle 100. When the battery 11 is replaced, a replacing battery 11 tends to be fully charged. Accordingly, a correction with the acceptance current I can be made at an appropriate timing even unless the timing is intentionally adjusted to a timing of refresh charge for substantially fully charging the battery 11, by synchronizing the correction with the acceptance current I with replacement of the battery 11. In consequence, the charge rate can be efficiently and accurately corrected.

The control device 1 may have, for example, an initialization detection unit 43. The initialization detection unit 43 is an exemplary detection unit that detects initialization of the correction of the charge rate. The initialization detection unit 43 detects, for example, that the correction value of the battery 11 has been reset.

The charge rate correction unit 33 corrects the current charge rate based on the behavior of the acceptance current I, in synchronization with a detection timing at which initialization of the correction of the charge rate is detected by the initialization detection unit 43. For example, the charge rate correction unit 33 corrects the charge rate of the battery 11 based on the behavior of the acceptance current I until the lapse of a predetermined time from a timing at which the correction of the charge rate of the battery 11 is initialized. When the correction of the charge rate is initialized, the battery 11 tends to be fully charged. Accordingly, a correction with the acceptance current I can be made at an appropriate timing even unless the timing is intentionally adjusted to a timing of refresh charge for substantially fully charging the battery 11, by synchronizing the correction with the acceptance current I with initialization of the correction of the charge rate. In consequence, the charge rate can be efficiently and accurately corrected.

The control device 1 may have, for example, a control changeover unit 51. The control changeover unit 51 may limit the control in which the charge rate is used (e.g., charge control, S&S control or the like) in the case where a correction with the acceptance current I cannot be made due to the influence of polarization resulting from charging from a low capacity, for example, when the correction value Δ needs to be calculated. Owing to this limitation, the use of an inaccurate charge rate can be prevented. Therefore, overdischarge of the battery 11, a startup failure of the engine 26, and progress of a deterioration in the battery 11 can be prevented.

Figure 4:
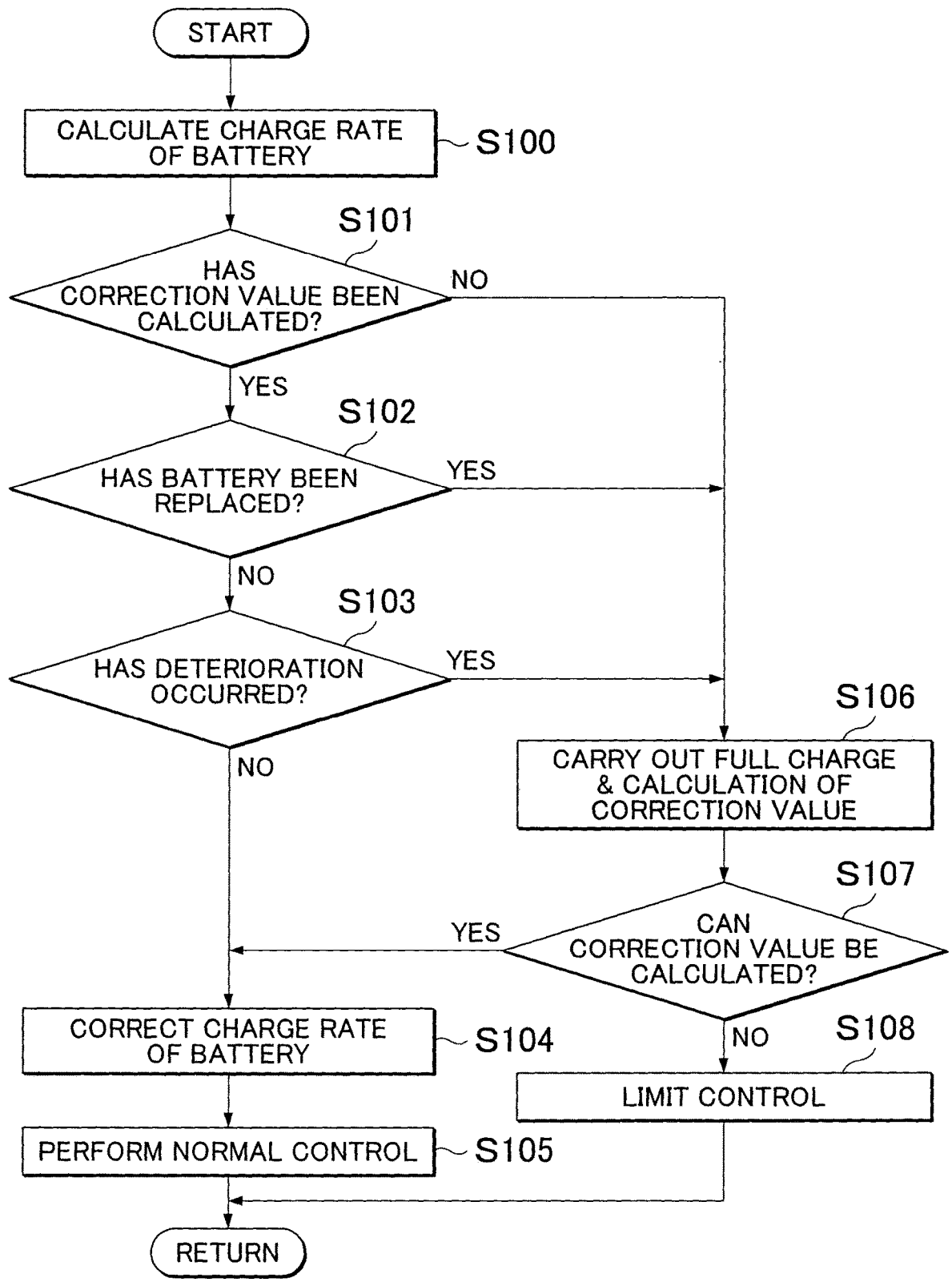
FIG. 4 is a flowchart showing the exemplary method of correcting the charge rate.

FIG. 4 is a flowchart showing an exemplary method of correcting the charge rate.

In step S100, the charge rate calculation unit 32 calculates a charge rate of the battery 11 based on at least one of a battery voltage and an integrated value of a battery current.

In step S101, the charge control unit 31 determines, based on a behavior of the acceptance current I, whether or not the correction value Δ has been calculated by the charge rate correction unit 33.

In step S102, the charge rate correction unit 33 determines whether or not the battery 11 has been replaced, by the replacement detection unit 42.

In step S103, the charge control unit 31 determines, based on a degree of deterioration obtained by the deterioration determination unit 41, whether or not refresh charge should be carried out to prevent the deterioration from progressing and calculate the correction value Δ.

Incidentally, steps S101, S102 and S103 are not absolutely required to be carried out in this order.

Step S104 is a process in the case where it is determined that the correction value Δ has been already calculated, that the battery has not been replaced, and that the deterioration has not progressed. The charge rate correction unit 33 corrects the charge rate, based on the correction value Δ that has been already calculated.

In step S105, the charge rate correction unit 33 commands the control changeover unit 51 to perform normal control based on the charge rate corrected in step S104.

Step S106 is a process in the case where it is determined that the correction value Δ has not been calculated, that the battery has been replaced, or that the deterioration has progressed. The charge control unit 31 carries out refresh charge such that the battery 11 is fully charged, and the charge rate correction unit 33 calculates the correction value Δ by making a correction with the acceptance current I.

Step S107 is a process to which a shift is made when refresh charge is completed. The charge rate correction unit 33 determines whether or not it has been possible to make a correction with the acceptance current I and calculate the correction value Δ, in a state where the correction with the acceptance current I can be made with high accuracy.

The charge rate correction unit 33 corrects the charge rate based on the correction value Δ, if it has been possible to make the correction with the acceptance current I and calculate the correction value Δ in a state where the correction with the acceptance current I can be made with high accuracy (step S104).

Step S108 is a process to which a shift is made when it is impossible to make a correction with the acceptance current I and calculate the correction value Δ in a state where the correction with the acceptance current I can be made with high accuracy. The charge rate correction unit 33 commands the control changeover unit 51 to limit (and also prohibit) the performance of the control in which the charge rate is used. For example, the charge rate correction unit 33 commands the control changeover unit 51 to use the charge rate estimated on the safe side.

Although the vehicle charge control device has been described above with reference to the embodiment of the invention, the invention should not be limited to the foregoing embodiment thereof. A combination with one or some of other embodiments and various modifications and improvements such as substitution and the like are possible within the scope of the invention.

For example, the vehicle charge control device may be a single control unit or a device that is constituted of a plurality of control units. Besides, the battery may be another type of secondary battery other than the lead battery (e.g., a lithium-ion battery or the like).

Besides, a correction with the acceptance current I is not limited to the method of correcting the charge rate based on the current value of the acceptance current I and the change in the current value. It is also appropriate to adopt a method of correcting the charge rate based on the integrated value of the current of the acceptance current I and the change in the integrated value.

Besides, the charge rate correction unit 33 may correct the charge rate in synchronization with the timing at which a change in a battery characteristic other than a deterioration (e.g., an increase or decrease in the amount of electrolytic solution in the battery, the throwing of an addition agent into the battery, or the like) is detected.

What is claimed is:

1. A vehicle charge control device comprising:
a charge unit that is configured to perform a charge operation for suppressing a deterioration in a battery by charging the battery until a charge end phase in which an acceptance current of the battery is smaller than a predetermined current value, the battery being mounted on a vehicle; and
a correction unit that is configured to correct a state of charge of the battery based on a behavior of the acceptance current, wherein
the correction unit is configured to correct the state of charge based on the behavior in the charge end phase, in synchronization with the charge operation,
the charging of the battery is continued until a predetermined time has passed after the acceptance current decreases below a predetermined current value, and
the state of charge is corrected when the predetermined time has passed after the acceptance current decreases below the predetermined current value.

2. The vehicle charge control device according to claim 1, further comprising:
a determination unit that is configured to determine a degree of deterioration in the battery, wherein
the charge unit is configured to perform the charge operation when the degree of deterioration reaches a threshold.

3. The vehicle charge control device according to claim 2, wherein the correction unit is configured to correct the state of charge based on a correction value, the correction value being calculated based on the behavior in the charge end phase in synchronization with the charge operation, and the charge unit does not perform the charge operation when the correction value is calculated before the degree of deterioration reaches the threshold.

4. The vehicle charge control device according to claim 3, wherein when the charge operation is not performed, the correction unit is configured to correct the state of charge based on a previous correction value that has been already calculated in synchronization with the charge operation.

5. The vehicle charge control device according to claim 3, wherein the correction value is calculated by the correction unit.

6. The vehicle charge control device according to claim 1, wherein the correction unit is configured to correct the state of charge based on the behavior, in synchronization with replacement of the battery.

7. The vehicle charge control device according to claim 1, wherein the correction unit is configured to correct the state of charge based on the behavior, in synchronization with initialization of correction of the state of charge.

8. The vehicle charge control device according to claim 1, wherein the correction unit is configured to correct, based on a correction value, the state of charge that is calculated according to a second method different from a first method of calculating the state of charge based on the behavior in the charge end phase in synchronization with the charge operation, the correction value being calculated based on the behavior in the charge end phase in synchronization with the charge operation.

9. The vehicle charge control device according to claim 8, wherein the correction value is determined in accordance with a difference between a first calculated value of the state of charge and a second calculated value of the state of charge, the first calculated value being calculated based on the behavior in the charge end phase in synchronization with the charge operation, and the second calculated value being calculated, based on a voltage of the battery, around a time when the first calculated value is calculated.

10. The vehicle charge control device according to claim 8, wherein the second method is a method of calculating the state of charge based on an integrated value of a charge amount of the battery and a discharge amount of the battery.

11. The vehicle charge control device according to claim 10, wherein the second method is a method of calculating the state of charge based on an off-voltage of the battery and the integrated value, the off-voltage is a voltage in a state where an ignition switch of the vehicle is off.

12. The vehicle charge control device according to claim 8, wherein the correction value is calculated by the correction unit.

13. The vehicle charge control device according to claim 1, wherein the correction unit is configured to limit a control in which the state of charge is used, when the state of charge is not corrected in synchronization with the charge operation.

14. The vehicle charge control device according to claim 1, wherein the correction unit is configured to correct the state of charge based on the behavior in the charge end phase, when the charge operation is completed.

15. The vehicle charge control device according to claim 1, further comprising:

a state of charge calculation unit that is configured to calculate the state of charge.

16. The vehicle charge control device according to claim 1, wherein the charge unit is configured to charge the battery to at least a predetermined state of charge over at least a predetermined charge time in the charge operation.

17. The vehicle charge control device according to claim 1, wherein the correction unit is configured to correct the state of charge by offsetting, by a predetermined amount, a state of charge that is obtained at a time when a predetermined time has elapsed after the acceptance current falls below the predetermined current value.

18. The vehicle charge control device according to claim 1, wherein the state of charge of the battery is a value that is defined as a ratio of a remaining capacity of the battery to a full charge capacity of the battery.

* * * * *